United States Patent [19]
Bremer et al.

[11] Patent Number: 5,099,478
[45] Date of Patent: Mar. 24, 1992

[54] COMMUNICATION OF SECONDARY CHANNEL BYTE IN A SYNCHRONOUS MODEM WITHOUT STATISTICAL UNCERTAINTY

[75] Inventors: Gordon Bremer, Clearwater; William L. Betts, St. Petersburg, both of Fla.

[73] Assignee: A.T.& T. Paradyne, Largo, Fla.

[21] Appl. No.: 355,663

[22] Filed: May 23, 1989

[51] Int. Cl.$^5$ .................................................. H04J 15/00
[52] U.S. Cl. .............................. 370/100.1; 370/110.1; 370/119
[58] Field of Search .................. 370/119, 110.1, 84, 370/100.1, 112; 375/39; 371/49.1

[56] References Cited

U.S. PATENT DOCUMENTS

| | | | |
|---|---|---|---|
| 4,408,325 | 10/1983 | Grover | 370/119 |
| 4,651,320 | 3/1987 | Thapar | 375/39 |
| 4,688,233 | 8/1987 | Nishiwaki et al. | 370/102 |
| 4,721,928 | 1/1988 | Yoshida | 375/39 |
| 4,860,308 | 8/1989 | Kamerman et al. | 370/110.1 |

Primary Examiner—Benedict V. Safourek
Assistant Examiner—Dang Ton
Attorney, Agent, or Firm—Kane, Dalsimer, Sullivan, Kurucz, Levy, Eisele and Richard

[57] ABSTRACT

A method and system for communicating data over a communications channel such as a telephone line includes the conversion of asynchronous data transmitted from a diagnostic microcomputer through a modem into synchronous data for transmission over the communications channel. The method includes the use of error vectors to shift the asynchronous data into a continuous synchronous stream of data bits.

4 Claims, 4 Drawing Sheets

| SUBPERIOD | $C_o = 1$ | $C_o = 0$ |
|---|---|---|
| SP 1 | +E | 0 |
| 2 | +E | 0 |
| 3 | ±E | 0 |
| 4 | DEPENDING | 0 |
| 5 | ON | 0 |
| 6 | POLARITY | 0 |
| 7 | OF | 0 |
| 8 | $B_i$ | 0 |
| 9 | ↓ | 0 |
| 10 |  | 0 |

COMMUNICATION OF SECONDARY CHANNEL BYTE IN A SYNCHRONOUS MODEM WITHOUT STATISTICAL UNCERTAINTY

BACKGROUND OF THE INVENTION

1. Field of the Invention

This invention relates to a system and method for exchanging data over a communication channel and more specifically to modems equipped to exchange secondary channel information in an efficient manner.

2. Description of the Prior Art

It should be noted at the outset that the primary channel messages referred to herein are the synchronous data which is being communicated over the channel, while the secondary channel messages referred to the other additional asynchronous information being exchanged between the transmitter and receiver modem circuits such as "a retraining message is coming".

Primary channels such as those used in the present invention transmit data information at a constant synchronous rate. Thus, since it is known when each bit is to be communicated, the filters and detectors can be matched to the bit rate. The synchronous system requires, of course, that timing information be provided to the filters and detectors of the modem.

On the other hand, with asynchronous transmission in a secondary channel message, the timing of individual bit transmissions is not accurately known and consequently prior art systems have framed transmission bytes of, e.g., eight bits with added start and stop bits. However, in the prior art previous example of an eight bit byte, the start and stop bits render the message transmission 20% less efficient.

The typical prior art system shown in FIG. 5 for communicating the aforementioned primary data and secondary message channels over a communications link comprises a diagnostic microcomputer (DMC) 100 and a UART 101 secondary channel data in an asynchronous 10-bit signal which generates eight character bits and stop and start bits. The transmitter circuit conveys this information in the form of a serial bit stream at a bit rate of, for example, 110 bits/second with no associated clock signal. In a universal asynchronous receiver transmitter chip (UART) 101 the asynchronous serial data at 110 bits/second is then conveyed to an LSI module secondary channel frequency shift key transmitter 102 arbitrarily designated "secondary channel" which samples the bits at a high rate (for example, 38.4 KHz) and frequency-shift keys the incoming bits into two carrier frequencies (for example, 450 Hz or 390 Hz) depending on whether they are "1" or "0" bits for transmission over the channel. The transmitter circuit also contains a primary modem transmitter 103 for quadrature amplitude modulation which accepts generated data for conventional synchronous transmission, with timing information, of the generated data over the channel. Adder 104 adds data from transmitter 102 and primary modem 103 and transmits the results to the receiver circuit 105.

The receiver circuit 105 for the prior art system comprises a primary modem receiver 106 and filters 107 and proxy frequency shift key receiver 108 which accept the synchronous signal from the aforementioned primary modem transmitter and decodes and demodulates the signal in a manner well known to those skilled in the art. Primary data is received at primary modem 109. The secondary asynchronous signal, which has been frequency-shift keyed at the transmitter, is demodulated in a proxy frequency shift key receiver 108 to derive asynchronous bits which are sampled at, for example, about 1600 Hz. The demodulated signal is then conveyed as a series of bits at for example, 110 bits/second, to a receiver universal asynchronous receiver transmitter module 111 wherein a start bit for a character is determined by correlating the bit pattern over many bit times, and then eight bits after the start bit are sampled. Finally, the eight bit character information is conveyed to a receiver diagnostic microcomputer 112.

In this prior art system the primary data and secondary data are communicated independently on the communication channel by means of band-separation filtering. As it is necessary in this prior art system to create an independent secondary channel which occupies additional bandwidth, a wider total bandwidth is required in order to maintain performance. Additionally, filters are required for both the primary and secondary channel as shown n FIG. 5. Furthermore, the secondary channel is always transmitting, regardless of whether there is data to be transmitted or not, thereby requiring the increased bandwidth at all times.

OBJECTIVES AND SUMMARY OF THE INVENTION

A primary objective of the invention is to operate a secondary channel with byte synchronous protocol.

Another objective of the invention is to communicate secondary channel information without start and stop control bits so as to save bandwidth.

Another objective is to independently communicate the secondary information in the same channel bandwidth as the primary data.

Other objectives and advantages of the invention will become apparent from the following description.

The present invention makes use of a low rate clock to which all of the secondary channel information is synchronized. A low rate clock is required because the secondary channel data is transmitted at a low speed relative to primary data.

The rate of the low rate clock is established by dividing the primary data symbol rate by a constant factor. The low rate clock is then grouped into a number of subperiods such as 10 which then offer a corresponding number of time slots in which to send information. Within each group of 10 subperiods, primary channel signals may be modified by an error vector to indicate the presence of a byte of secondary channel information and further modified to indicate the eight bit pattern of the byte of information.

DETAILED DESCRIPTION OF THE INVENTION

As mentioned previously, the rate of the low rate clock is established by dividing the primary data symbol rates being transmitted by the modem over the communication channel by a constant factor. For example, with a primary symbol rate of 2400 cycles per second a typical division factor would be 200 resulting in a low rate clock having a twelve cycle per second period. The low rate clock is then subdivided into ten subperiods of 20 symbols each. These then subperiods (SP1) offer 10 time slots in which to send secondary information.

Since bytes are generated by the diagnostic microcomputer at less than 12 Hz, occasionally a modem will not have a byte to transmit. To handle this the modem creates a bit $C_0$. If a new byte has been accepted from the Diagnostic Microcomputer and has not yet been transmitted, $C_0 = 1$. Otherwise $C_0 = 0$, indicating no character to be sent.

The system of the present invention enables the modem to transmit nine possible bits with a tenth at being held in reserve. These bits are designated as bits $B_0$-$B_7$ and bit $C_0$.

These are assigned to the subperiod as follows:

| SP1 = $C_0$ | SP4 = $B_1$ | SP7 = $B_4$ | SP10 = $B_7$ |
|---|---|---|---|
| SP2 = $C_0$ | SP5 = $B_2$ | SP8 = $B_5$ | |
| SP3 = $B_0$ | SP6 = $B_3$ | SP9 = $B_6$ | |

The information in each subperiod is now used to effect a minor change in all points of the primary signal space for all twenty symbols of the subperiod. Although this change could be made by various methods such as adding a small constant error vector, adding an alternating error vector, adding a pseudorandom error vector, radial modulation, phase modulation, etc., the embodiment shown here comprises adding an error vector to the signal points. This error vector is referred to as E and is shown in the eye pattern of FIG. 2.

Figures 1, 2:
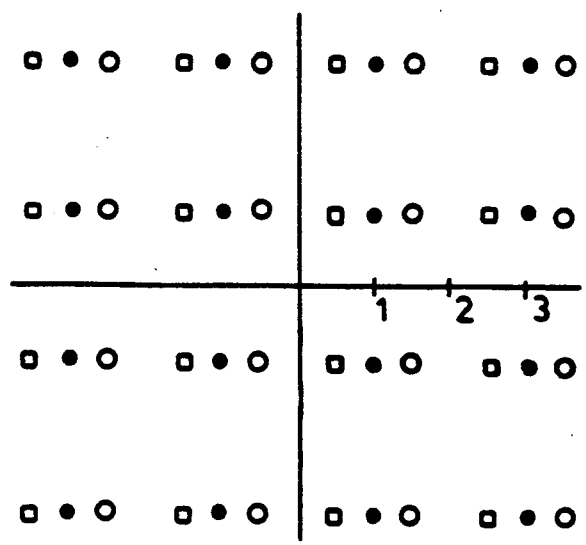
FIG. 1 illustrates a table showing how each error vector may be determined.
FIG. 2 shows an eye pattern describing a determination of the error vector.

FIG. 1 shows a table for the error vector E. Note that if $C_0 = 0$ (no character should be sent), no error vector is added so the normal primary signal space is transmitted. If $C_0 = 1$, $+E$ is sent to the first two subperiods. This provides an improved probability of receiving bit $C_0$ since $-E$ is never sent, the receiver has a polarity reference available to monitor for potential phase hits causing loss of reference via signal space rotations of $\pm 90°$ or $180°$.

In the receiver, the first 40 symbols are used to sum the equalizer error. If the sum is less than 20, $C_0 = 0$; otherwise $C_0 = 1$. If $C_0 = 1$, then the 20 symbols in each succeeding subperiod are summed to determine $B_1$.

With respect the eye pattern of FIG. 2, the ordinary points to be transmitted would be the black dots shown in the pattern. However, if the error vector is plus, the circles are transmitted, and if the error vector is minus, the points transmitted correspond to the squares.

Figure 3:
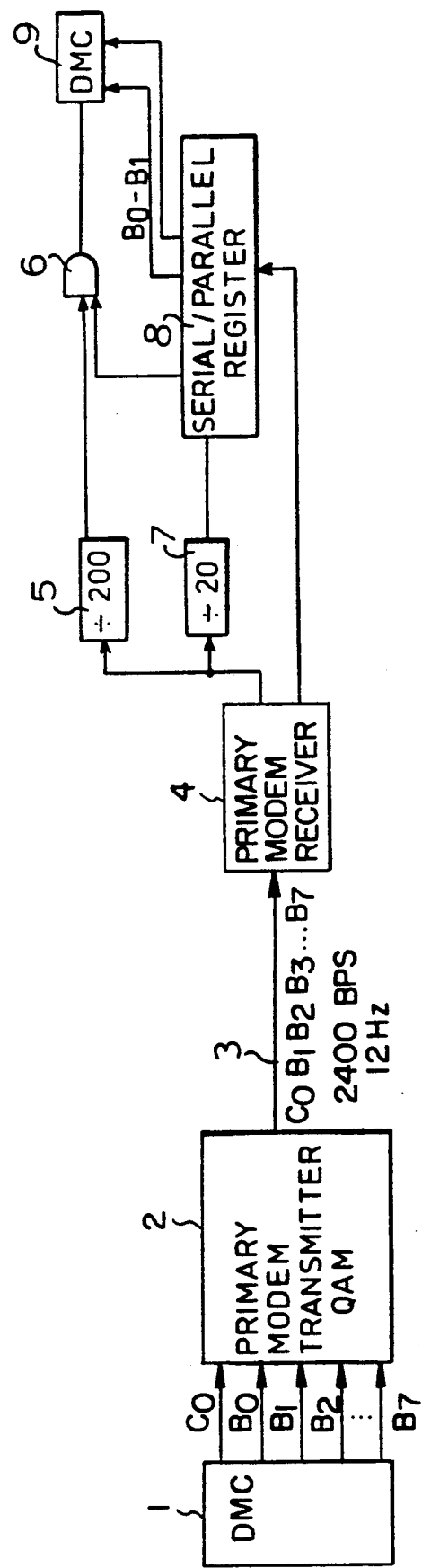
FIG. 3 shows a circuit configuration which may be used to implement the system of the present invention.
Figure 4:
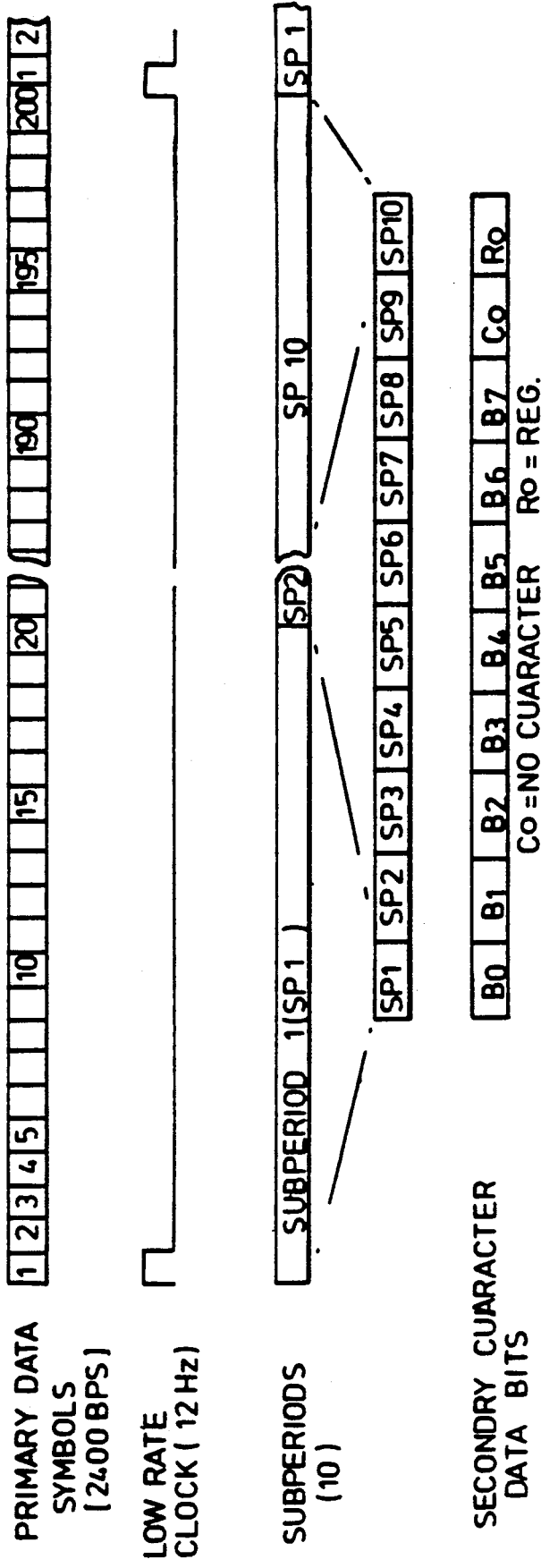
FIG. 4 illustrates the timing relationship of the various elements of the system.
Figure 5:
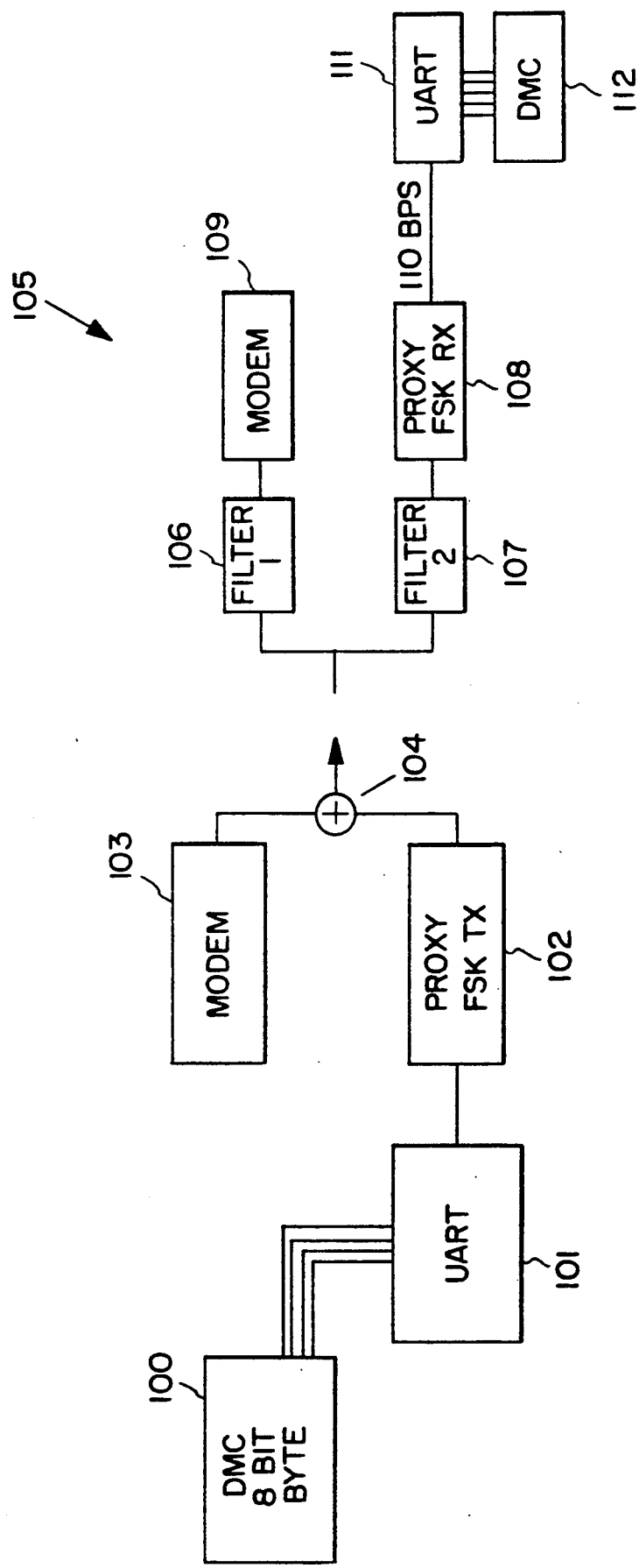
FIG. 5 shows a typical prior art apparatus.

As shown in FIG. 3, the diagnostic microcomputer 1 generates an 8 bit word of diagnostic data. This data is clocked in a parallel fashion into the primary modem transmitter QAM 2.

The primary modem transmitter QAM 2 transmits primary data at symbol rate of, for example, 2400 bits. Transmitter 2 also includes a low speed clock (not shown) with a frequency of, for example, 12 hertz.

The transmitter 2 recognizes the transfer of eight bits via bit $C_0$ and transfers this data as previously described to primary modem receiver 4 via communication line 3.

The signal then travels to symbol counter 5 which is a divide by 200 counter. At the end of each period of counting, it sends a signal to AND gate 6. Counter 7 divides the symbols by 20 down to the subperiod range. The output of counter 7 goes to serial/parallel register 8 together with an alternate output from the primary modem receiver 4. At the end of each subperiod, a $C_0$ bit is sent to AND gate 6. An interrupt will be generated if the $C_0$ bit indicates that a data bit is indeed present.

Thus the interrupt signal generated by the AND gate will not occur at the end of the symbol unless the $C_0$ bit is present, indicating a synchronous condition. Also, the data bits $B_0$-$B_7$ are transferred from the parallel register 8 to a diagnostic microcomputer 9.

For this apparatus to function properly, the low speed clocks of the transmitter 2 and the receiver 4 must be synchronized. This is accomplished through unobtrusive signature analysis as described in the commonly assigned application, Unobtrusive Signature for Modulated Signals, Ser. No. 083,696, by William Betts.

What is claimed is:

1. A method of transmitting secondary channel data signals along with primary data over a communications channel comprising the steps of:
   converting asynchronous secondary data bits generated at a first end of the communication channel into a stream of synchronous secondary channel data bits for transmission over said channel;
   indicating the presence of said synchronous secondary channel data bits by modifying said primary data with an error vector;
   transmitting the synchronous secondary channel data bits over said channel; and
   converting the synchronous data bits received at a second end of said channel into asynchronous data.

2. The method of claim 1 wherein said step of indicating said synchronous secondary channel data bits modifies said primary data with one of a plurality of error vectors to indicate a byte pattern of said synchronous secondary channel data bits.

3. A system of transmitting secondary channel data signals over a communications channel comprising:
   means for generating asynchronous data bits;
   means for converting said asynchronous data bits into a stream of synchronous secondary channel data bits;
   means for indicting the presence of said synchronous secondary channel data bits by modifying primary data with an error vector;
   means for transmitting said synchronous data bits over said communications channel; and
   means for converting said synchronous data bits received at said channel's other end into asynchronous data bits.

4. The system of claim 3 wherein said indicating means further includes means for modifying said primary data with one of a plurality of error vectors to indicate a byte pattern of said synchronous channel data bits.

* * * * *